WILLIAM F. KETCHUM.
Improvement in Harvesters.
No. 4,673.
Reissued Dec. 12, 1871.
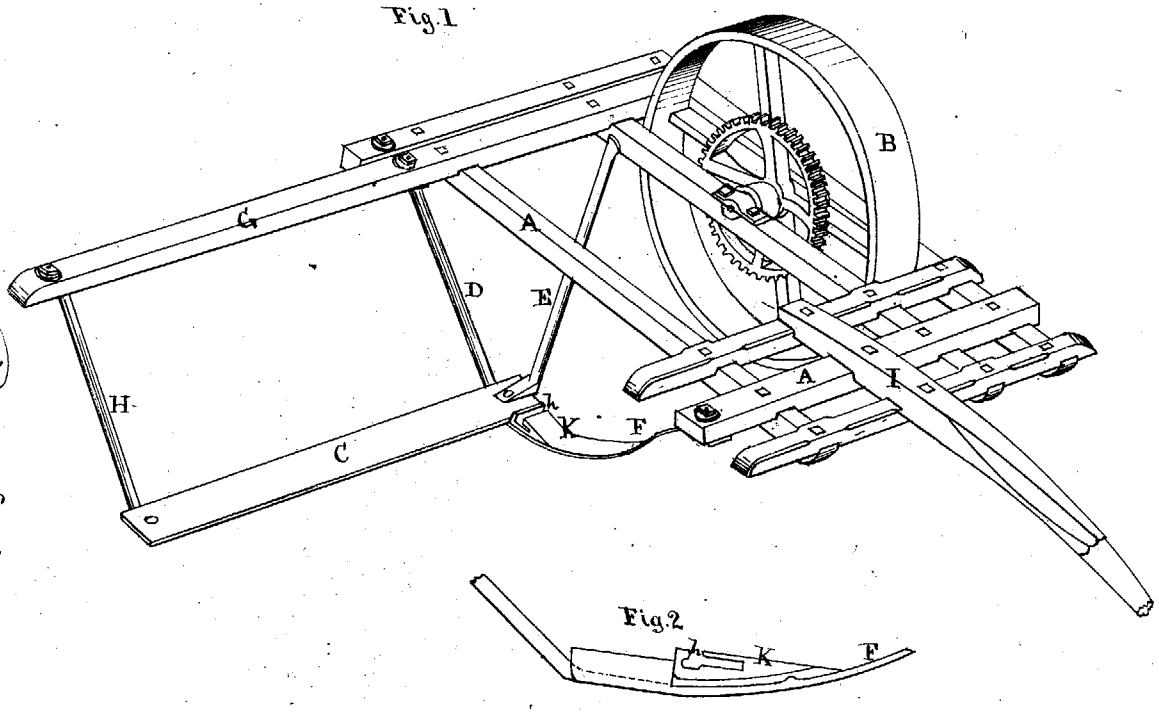
Witnesses
J. G. Knight
R. Leech
Rufus L. Howard
Assgn. Ketchum Harvesting Co
by
A. McCallum
Atty.
N. PETERS, PHOTO-LITHOGRAPHER, WASHINGTON, D. C.

UNITED STATES PATENT OFFICE.

KETCHUM HARVESTING MACHINE COMPANY, ASSIGNEE, BY MESNE ASSIGNMENTS, OF WILLIAM F. KETCHUM, DECEASED, OF BUFFALO, N. Y.

IMPROVEMENT IN HARVESTERS.

Specification forming part of Letters Patent No. 8,724, dated February 10, 1852; Reissue No. 259, dated February 28, 1854; Reissue No. 466, dated June 2, 1857; extended seven years; Reissue No. 3,034, dated July 14, 1868; Reissue No. 4,673, dated December 12, 1871.

DIVISION B.

*To all whom it may concern:*

Be it known that WILLIAM F. KETCHUM, late of the city of Buffalo, in the county of Erie and State of New York, deceased, in his life-time invented certain new and useful Improvements in Grass and Grain Cutting Machines, of which the following is a specification:

The invention relates to improvements in that class of machines which may be used either for mowing grass or harvesting grain, and for which a patent was granted to said WILLIAM F. KETCHUM, July 10, 1847.

The invention consists in a new and improved mode of supporting the finger-bar at a suitable distance from the ground, and at a convenient distance from the driving-wheel, whereby, while the necessary strength and rigidity are imparted to the finger-bar, its supports are so arranged as to be out of the way of the falling grass or grain, thereby preventing clogging or choking up of the operative parts of the machine.

In the accompanying drawing, Figure 1 is a perspective view of such portions of a machine as are necessary to show the improvements; Fig. 2, a portion of the same, showing the shoe attachment at the heel of the finger-bar.

A represents the main frame, composed of strong longitudinal bars, united at each end by cross-bars firmly bolted thereto. This frame is supported by a wheel, B, placed in the space between the longitudinal and the cross bars. This is the main wheel of the machine, upon which it travels, and by the revolution of which, through proper gearing, the cutters are made to operate. C is the finger-bar for supporting the cutters. It is placed close to the ground, at a convenient distance from the driving-wheel. D is an arm or brace, extending from the main frame, at a point in rear of the axle, to the heel of the finger-bar, for the support of the latter. E is another arm or brace, extending diagonally from the main frame, at a point in rear of the axle, to the heel of the finger-bar, for the same purpose. F is an arm or brace, extending from the main frame, at a point in front or forward of the axle, to the heel of the cutter-bar, for the same purpose. G represents a cross-bar in rear of the wheel, extending outward from the main frame above and behind and parallel with the finger-bar. H is an arm or brace, extending from the outer end of this bar G to the outer end of the finger-bar, for the support of the latter. I represents the tongue or draft-pole, secured to the forward cross-bars of the frame at a point in line intermediate between the heel of the finger-bar and the driving-wheel, the point of connection depending upon the distance between the wheel and the heel of the finger-bar, so as to equalize the draft of the machine or diminish the side draft when the cutters are in operation.

In a machine thus constructed it will be obvious that the finger-bar can be supported in the desired position with sufficient strength and rigidity, and with its supports so arranged as to leave a clear space for the operating mechanism, and be out of the way of the falling grass or grain, so that all danger of clogging from this cause is obviated.

What is claimed is—

1. The finger-bar C, supported by means of one or more arms or braces extending from the heel of the finger-bar to the front and rear of the frame, so as to leave a clear space for the operating mechanism, substantially as set forth.

2. In combination with the arms or braces extending from the heel of the finger-bar, as aforesaid, the brace H, extending from the outer end of the finger-bar upward and backward to the extended cross-bar G, for the purpose set forth.

R. L. HOWARD,
*Prest. K. H. M. Co.*

Witnesses:
H. U. SOPER,
GEO. H. HUGHSON.